United States Patent [19]

Ishikawa

[11] Patent Number: 4,682,305

[45] Date of Patent: Jul. 21, 1987

[54] STORAGE SYSTEM

[75] Inventor: Tatsuo Ishikawa, Hachioji, Japan

[73] Assignee: Kabushiki Kaisha Toshiba, Kawasaki, Japan

[21] Appl. No.: 654,955

[22] Filed: Sep. 27, 1984

[30] Foreign Application Priority Data

Sep. 30, 1983 [JP] Japan .............................. 58-182284

[51] Int. Cl.$^4$ ............................................ G06F 12/00
[52] U.S. Cl. ................................................... 364/900
[58] Field of Search ... 364/200 MS File, 900 MS File

[56] References Cited

U.S. PATENT DOCUMENTS 4,580,242  4/1986  Suzuki et al. .................... 364/900

Primary Examiner—Raulfe B. Zache
Attorney, Agent, or Firm—Schwartz, Jeffery, Schwaab, Mack, Blumenthal & Evans

[57] ABSTRACT

A storage system which comprises a first storage unit such as an optical disk incapable of rewriting; a second storage unit such as a magnetic disk capable of rewriting; a control table for registering addresses of the first storage unit in which data are desired to be rewritten and addresses of the second storage unit in which the write-in data are temporarily stored; and a control unit for controlling the second storage unit in accordance with this control table such that the data desird to be rewritten into said addresses of the first storage unit are temporarily stored in the corresponding addresses of the second storage unit. The present invention enables the first storage unit incapable of rewriting to operate as is capable of rewriting. Using an optical disk or other large-capacity storages as the first storage unit will provide a mass storage system capable of rewriting.

18 Claims, 15 Drawing Figures

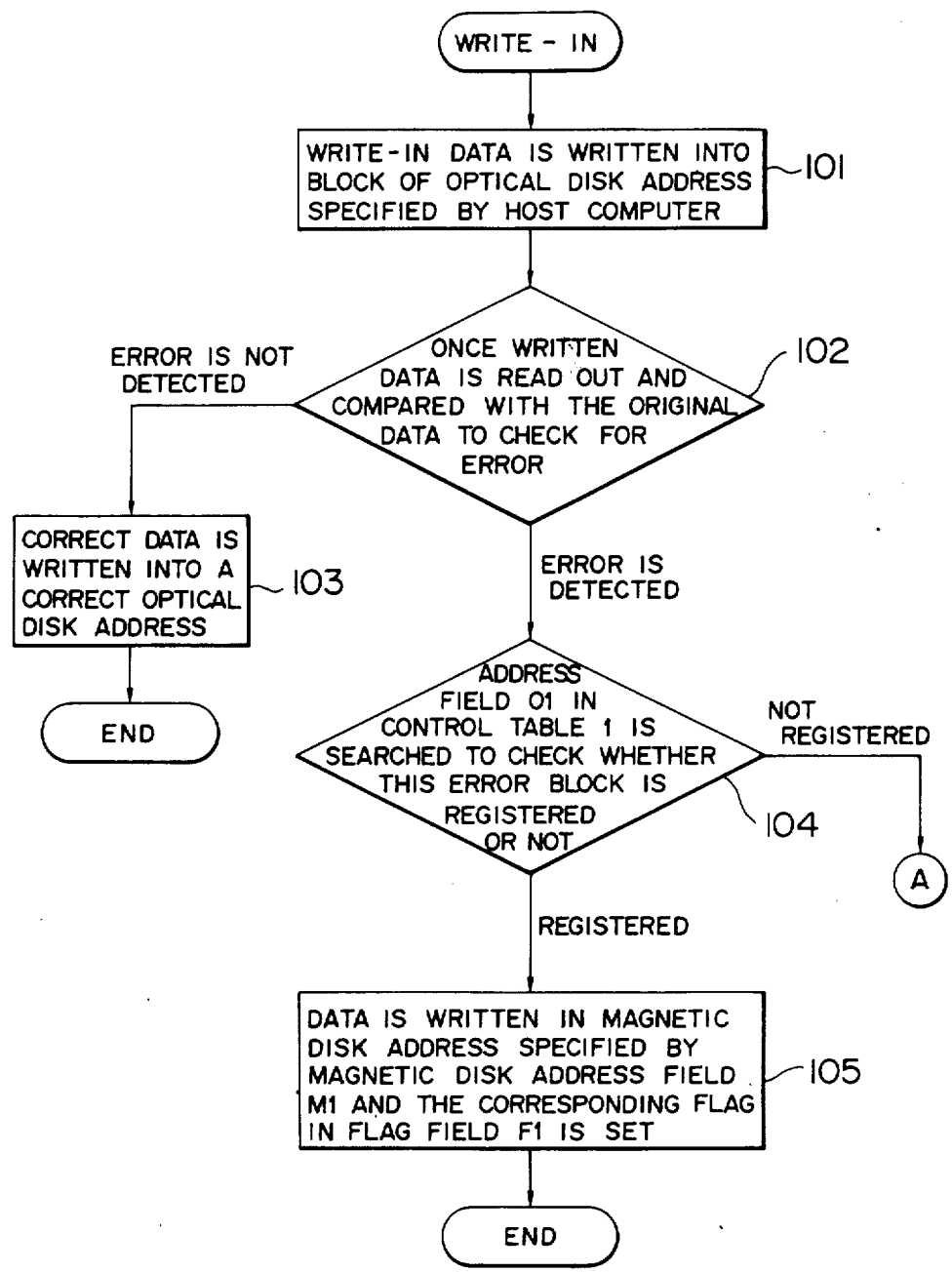

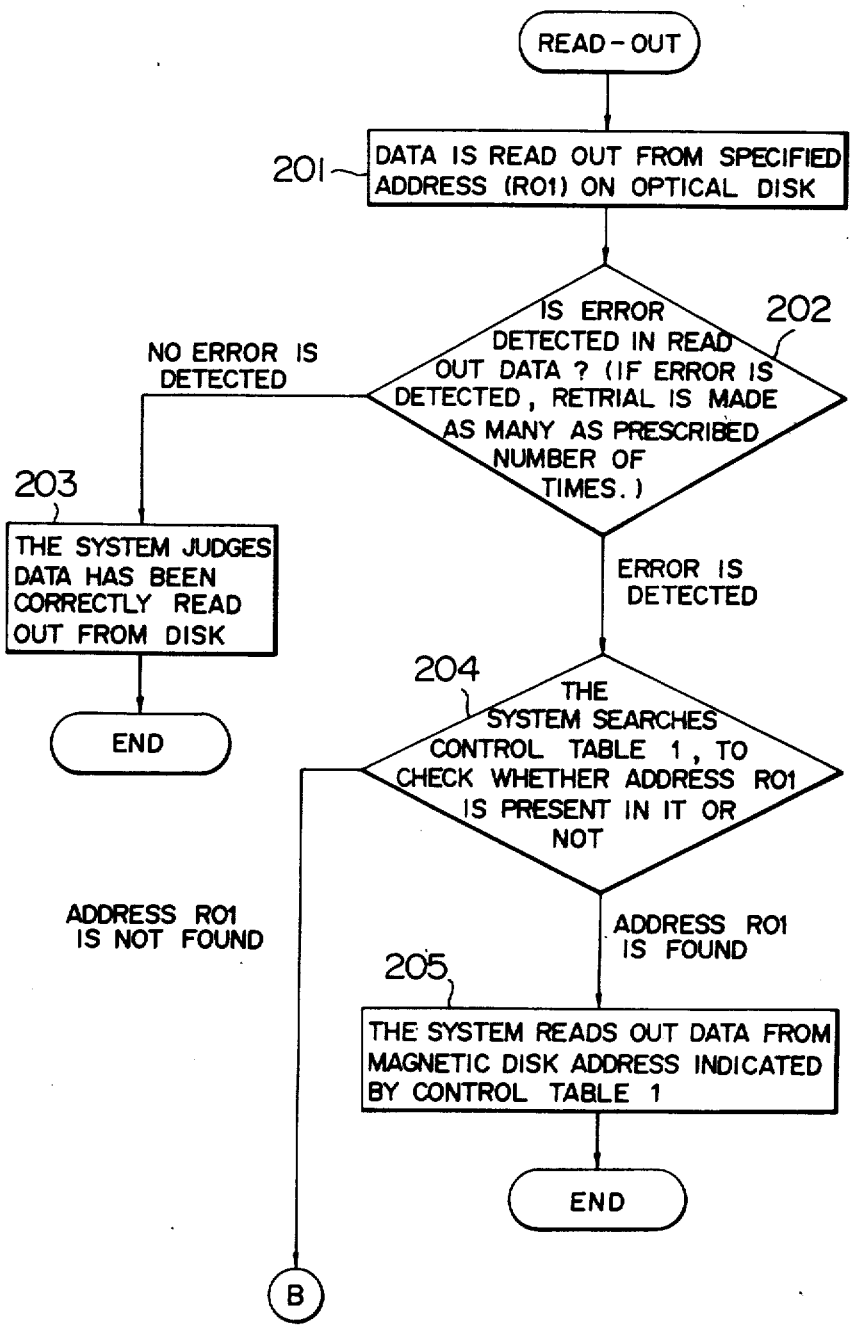

4,682,305

STORAGE SYSTEM

BACKGROUND OF THE INVENTION

The present invention relates to a storage system, and more particularly to a mass storage system used as a file memory to store documents.

Optical disks of large capacity of data in which users are able to write data of document, so-called direct read after write (DRAW) type optical disks, have recently been put to practical applications. The optical disks have, in addtion to their very large capacity, an advantage that they do not require a large place for storage as compared with magnetic disks. However, the DRAW type optical disks are disadvantageous in that no data can be written in the area on the optical disc where data have already been written. Therefore, the DRAW type optical disks can be used in such a case that data once written need not be updated permanently, but cannot be used in conventional mass storage systems in which data once written need to be changed.

SUMMARY OF THE INVENTION

An object of the present invention is to provide a mass storage system which operates as is capable of rewriting using an optical disk or other large-capacity storages which is incapable of rewriting. This object is achieved by a storage system which comprises: a first storage unit incapable of rewriting; a second storage unit capable of rewriting; a control table for registering one or more addresses of said first storage unit in which data are desired to be rewritten and one or more addresses of said second storage unit in which said rewrite data are temporarily stored; and a control unit for controlling said second storage unit in accordance with said control table such that said data desired to be rewritten into said addresses of said first storage unit are temporarily stored in the corresponding addresses of said second storage unit.

BRIEF DESCRIPTION OF THE DRAWINGS

In the accompanying drawings:

FIGS. 4A, 4B, 5A, 5B, 6 and 7 are flowcharts for various operations of this storage system.

DETAILED DESCRIPTION OF THE INVENTION

Figure 1:
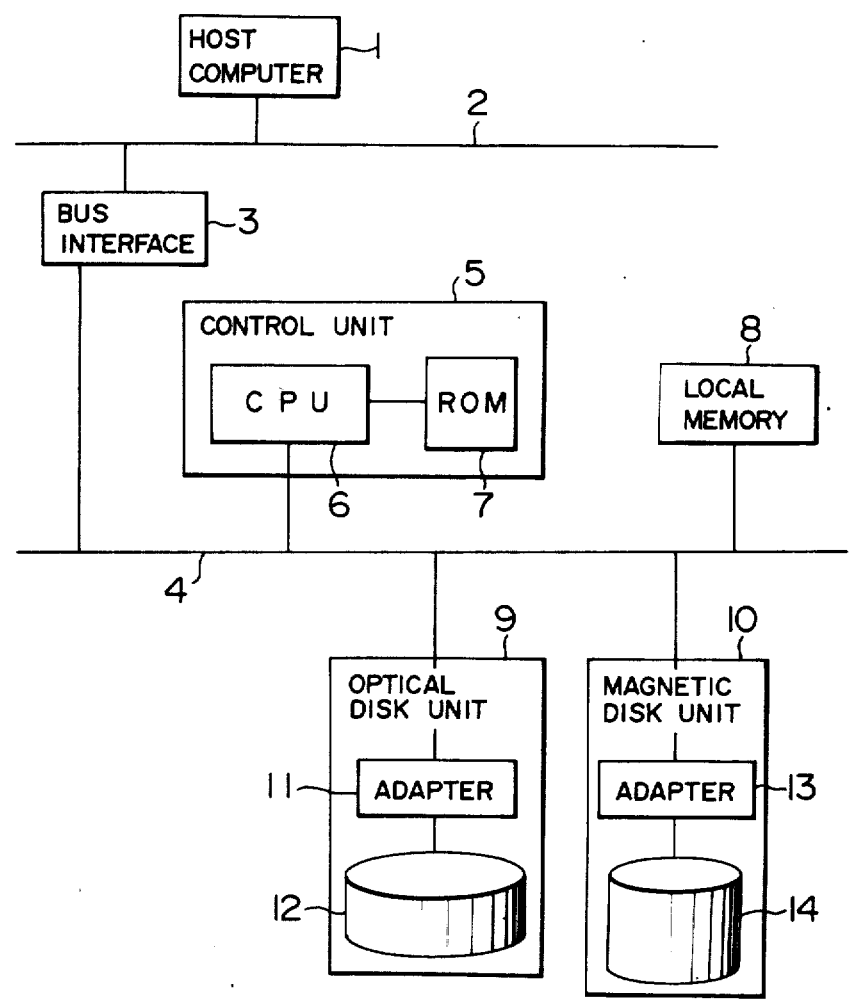
FIG. 1 is a block diagram showing a storage system according to the first embodiment of the present invention.

FIG. 1 shows a storage system according to the first embodiment of the present invention. In the storage system shown a host computer 1 is connected to a bus line 2. This bus line 2, in turn, is connected to a bus line 4 of the storage system via a bus interface 3. To the bus line 4 are also connected a control unit 5, a local memory 7, an optical disk unit 9, and a magnetic disk unit 10. The control unit 5 has a ROM 7 which stores microprograms for the control and a CPU 6 which controls the operations in accordance with the contents of the ROM 7. The optical disk unit 9 has an adapter 11 and an optical disk 12 as a storage medium. The magnetic disk unit 10 has an adapter 13 and a magnetic disk 14 as a storage medium.

Figure 2A:
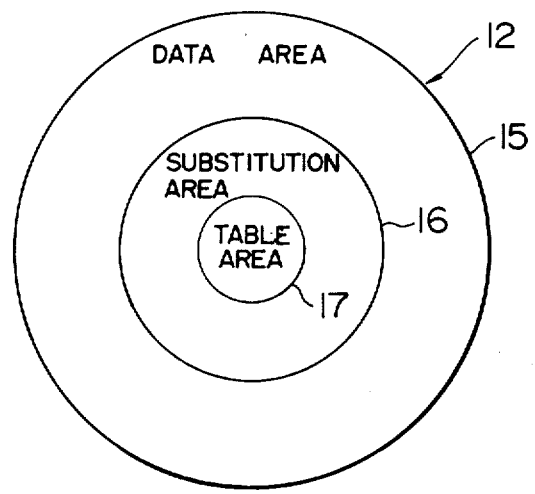
FIGS. 2A and 2B are memory maps of the optical disk and the magnetic disk of this storage system, respectively.
Figure 2B:
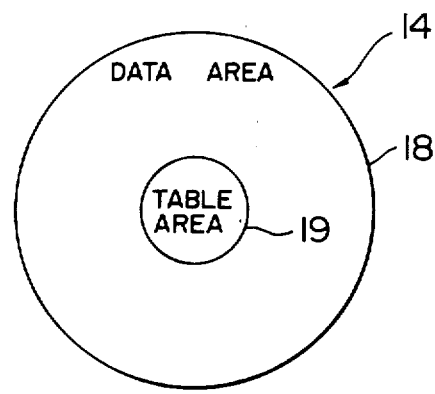

The optical disk 12, as shown in FIG. 2A, is divided into three areas: a data area 15 in which data are stored, a substitution area 16 in which rewrite data and other data are stored, and a table area 17 in which a control table 2, detailed later, is stored. The magnetic disk 14, as shown in FIG. 2B, is divided into two areas: a data area 18 in which data are stored and a table area 19 in which both the control tables 1 and 2, detailed later, are stored. Instead of providing this table area 19 in the magnetic disk 14, the control table 1 may be stored in the local memory 8.

Figure 3A:
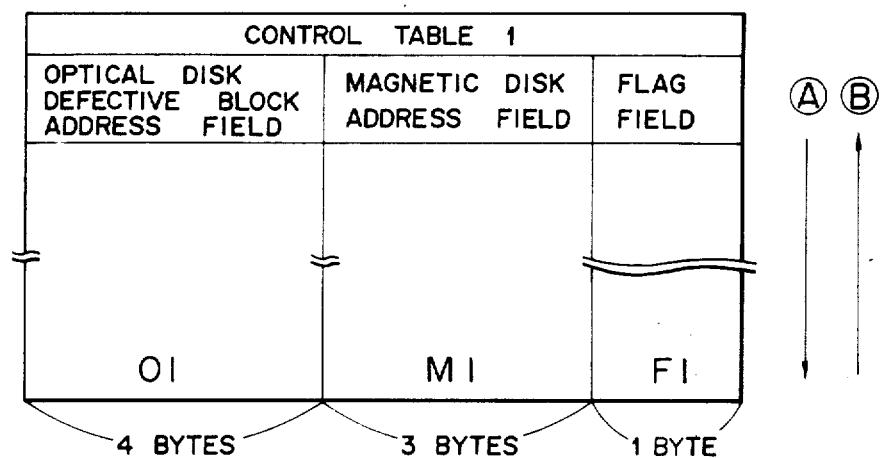
FIGS. 3A and 3B are diagrams showing control tables of this storage system, respectively.
Figure 3B:
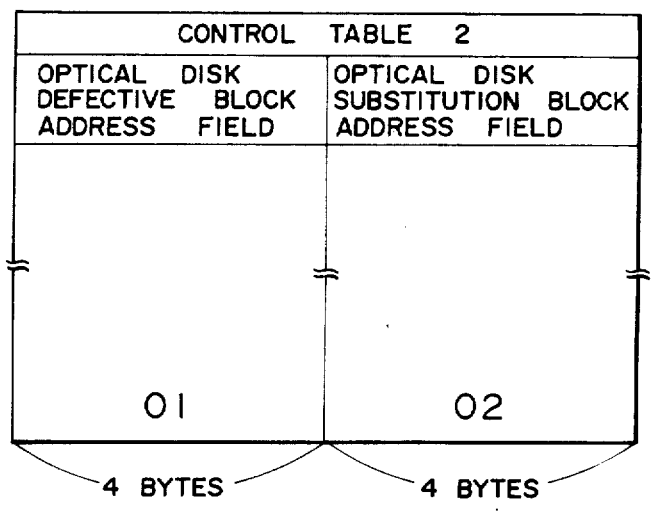

The control table 1, as shown in FIG. 3A, has three fields: an optical disk defective block address field O1 which indicates the addresses of the defective blocks of the optical disk 12, a magnetic disk address field M1 which indicates the addresses of the magnetic disk 14 on which data to be written into this defective block are stored, and a flag field F1 which indicates the number of rewritings into the magnetic disk 14. The control table 2, as shown in FIG. 3B, has two fields: the optical disk defective block address field O1, which is the same as that in the control table 1, and an optical disk substitution block address field O2 which indicates the addresses of optical disk substitution blocks in which data to be written into the defective blocks are stored. A defective block here refers not only to the one that has a defect on the optical disk 12 but also to such a block that a data read out, immediately after writing, from it does not coincide with the data which was intended to be written in. Therefore, "rewriting" always results in a defective block.

Figure 4B:
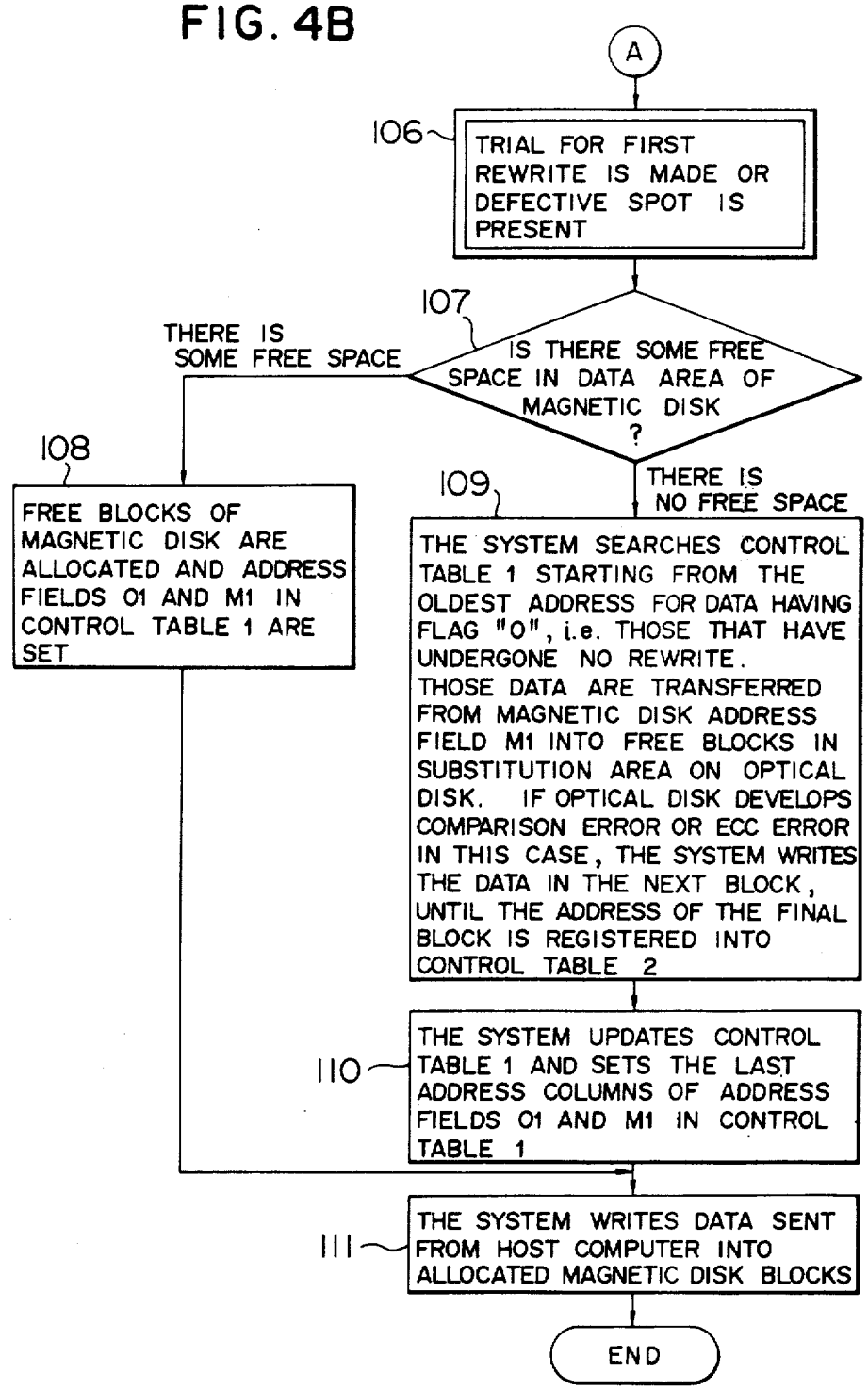

The operations of this embodiment are described below using flowcharts shown in FIGS. 4 to 7. The write operation, as shown in FIGS. 4A and 4B, starts with the writing of data from the host computer 1 into the block of a specified optical disk address (step 101). Though the optical disk 12 is incapable of rewriting, this embodiment attempts to write data irrespective of whether it is a rewrite data or virgin data. Next, thus written data is read out from the blcck and compared with the original data before the write-in, to be checked for a comparison error or ECC error (step 102). When no error is detected, the system judges that a correct data is written into a correct address of the optical disk (step 103), terminating the operation. If an error is detected instead, two cases are possible. The one is the case where the optical disk 12 has a defective spot on it. And the other is the case where a trial for rewrite is made into a block which already stores some data. This embodiment is featured in that the system operates as is capable of rewriting by handling the both cases of a trial for write and a defective spot in the same manner. That is, in the case of "error" due to either of the above two cases, the processing advances to step 104 to search the optical disk defective block address field O1 in the control table 1, to check whether the error block is registered or not in it. In this case it is desirable to search the field O1 from the latest address, i.e. from the bottom in direction Ⓑ shown in FIG. 3A. If this error block is found registered in the field O1 and, therefore, judged to have undergone a trial for rewrite, the write-in data is stored in a magnetic disk address indicated by the magnetic disk address field M1. And the corresponding flag in the flag field F1 is set to 1 (step 105), terminating the operation. If the error block is found not registered in the field O1 and, therefore, judged to undergo a trial for rewrite or to have a defective spot in itself on the optical disk 12 (step 106), it is necessary to allocate a block of the magnetic disk 14 to store the write-in data. For this purpose, the system judges whether or not the data area 18 on the magnetic disk 14 has some free space (step 107). If some free space is found, a block to store the write-in data is allocated in that free space and its address is written in the latest column of the address field M1. At the same time, the address of the error block on the optical disk 12 is written into the last column of the address field O1 (step 108). If no free space is found instead, a part of the data area 18 is transferred onto the optical disk 12 to create a free space in the data area 18 on the magnetic disk 14. In this case the part of the data area 18 may be transferred in an arbitrary sequential order.

This embodiment, however, takes advantage of the fact that blocks into which trial for rewrite has been made twice or more are liable to make further trial for rewrite than otherwise, executing the following processing (step 109). That is, the flag field F1 in the control table 1 is searched from the oldest address, i.e. in the direction Ⓐ as shown in FIG. 3A, to find data stored in the magnetic disk address field M1 corresponding to flag "O". Those data thus found having flag O are then written into free blocks in the substitution area 16 on the optical disk 12. If, in this case, a comparison error or ECC error occurs, the data are written in the next block until the address of the block of the substitution area 16 in which the last part of the data is stored is written into the optical disk substitution block address field O2 in the control table 2.

Next, the addresses of the blocks transferred into the substitution area 16 on the optical disk 12 are deleted from the control table, to sequentially cram the other address and flags and write into the last column of the control table 1 the address of the block on the magnetic disk 14 which is made free by the processing of step 109 (step 110). Finally at step 111, the system writes the write-in data sent from the host computer into the allocated block on the magnetic disk 14, terminating the operation. When the block is allocated at step 108, the system writes the write-in data sent from the host computer into the allocated block on the magnetic disk 14, terminating the operation.

Figure 5B:
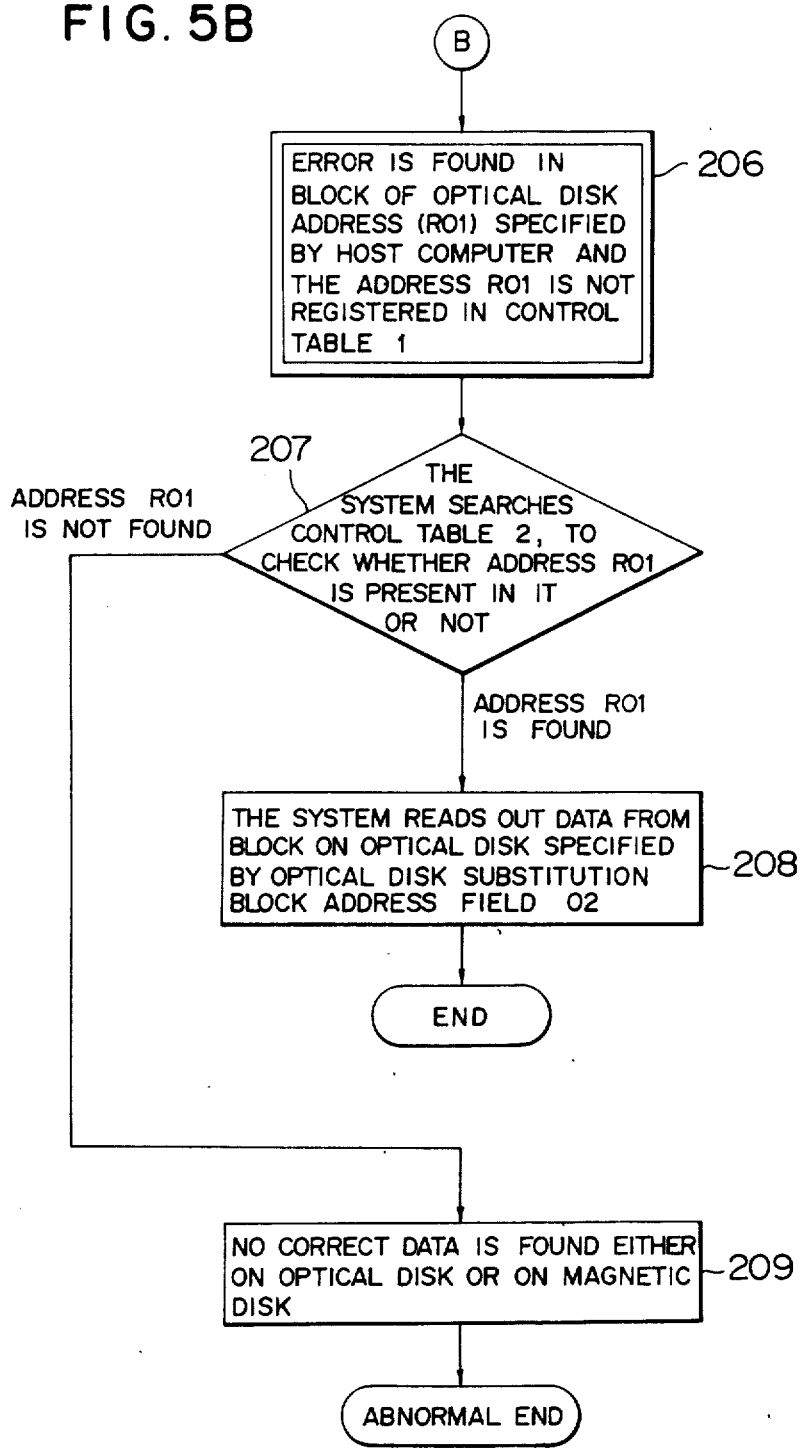

The read-out operation is described using FIGS. 5A and 5B as follows: First the data of a block of address RO1 on the optical disk 12 specified by the host computer 1 is read out (step 201), and checked for an error (step 202). When no error is detected, the system judges this read out data to be correct (step 203), terminating the operation. If an error is detected instead, the system repeats retrial for the read-out and checks a prescribed number of times (step 202). If the error recurs nevertheless, the system searches the optical disk defective block address field O1 in the control table 1, to check whether the address RO1 is present in it or not (step 204). If the address RO1 is found and, therefore, the system judges that the correct data must have been stored in a magnetic disk address indicated by the magnetic disk address field M1, it reads out this correct data from the magnetic disk 14 (step 205), terminating the operation. If, instead, the address RO1 is not found because the block of that address is faulty and, therefore, the system judges that the address RO1 is not registered in the control table 1 (step 206), it searches the optical disk defective block address field O1 in the control table 2, to check whether the address RO1 is present in it or not (step 207). If the address RO1 is found, the system reads out the data from the block on the optical disk 12 specified by the corresponding optical disk substitution block address field O1 (step 208), terminating the operation. If, instead, the address RO1 is not found in the control table 2 either, the system judges that no correct data is present either on the optical disk 12 or the magnetic disk 14, resulting in an abnormal end.

Figure 6:
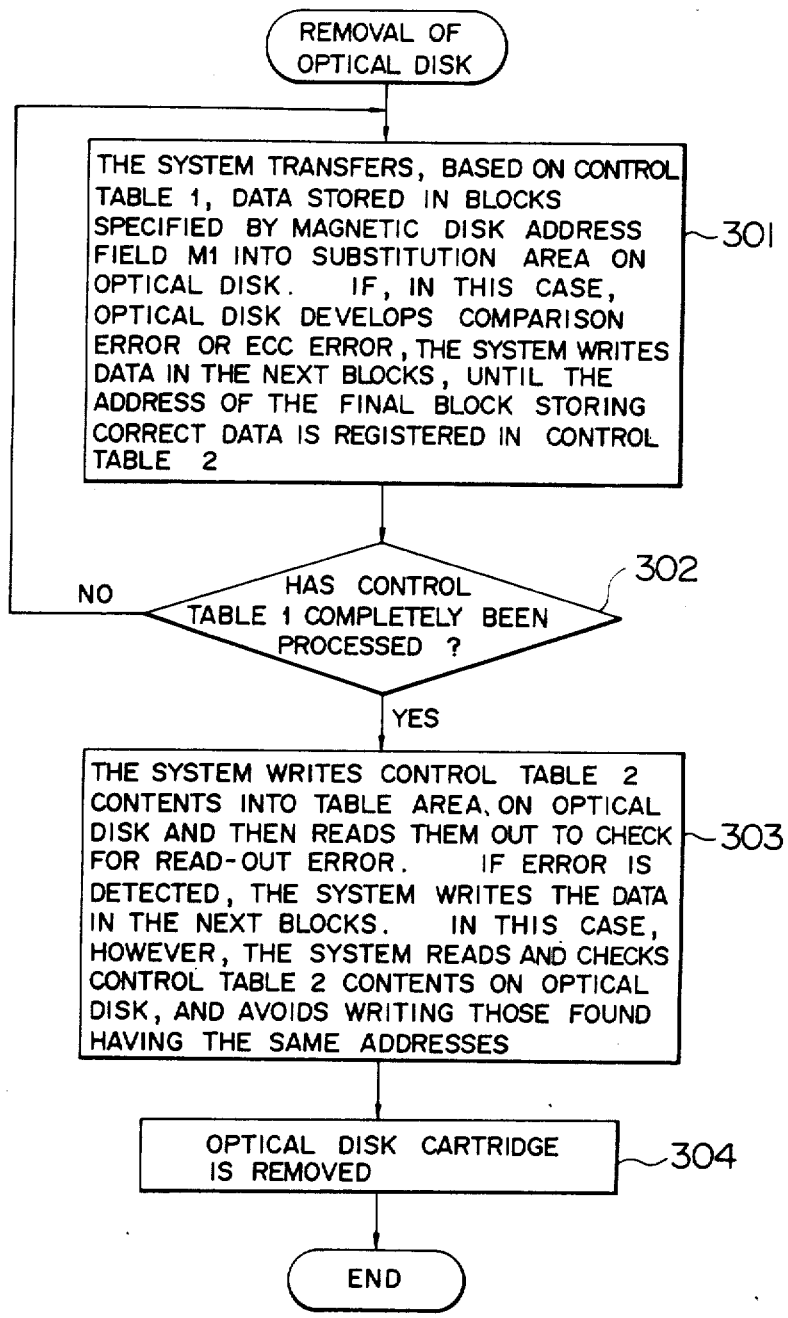

Next, the operation to remove the optical disk 12 after completion of all the write-in and read-out operations is described below using FIG. 6. Before removing the optical disk 12, all the data stored on the magnetic disk 14 must be transferred onto the optical disk 12. That is, first the contents of the blocks specified by the magnetic disk address field M1 are to be written into the substitution area 16 on the optical disk 12, in accordance with the control table 1. If, in this case, a comparison error or ECC error occurs, the system writes the data in the next block, until the address of a block in the substitution area 16 in which the last part of the correct data is written is finally registered in the optical disk substitution block address field O2 in the control table 2 (step 301). The step 301 is to be repeated until all the processes concerning the control table 1 are completed (step 302). When they have all been completed, the finally determined contents of the control table 2 are written into the table area 17 on the optical disk 12. Then the data thus written into blocks are read out and checked for coincidence errors. If an error is detected, the data are written in a block next to the error block (step 303). In this case, however, the same data in the control table 2 as those already stored in the table area 17 on the optical disk 12 are written in the table area 17. That is, only updated data are transferred, thus eliminating a waste of time and operations. When the contents of the control table 2 have all been transferred, the cartridge of the optical disk 12 is actually removed (step 304), terminating the operation.

Figure 7:
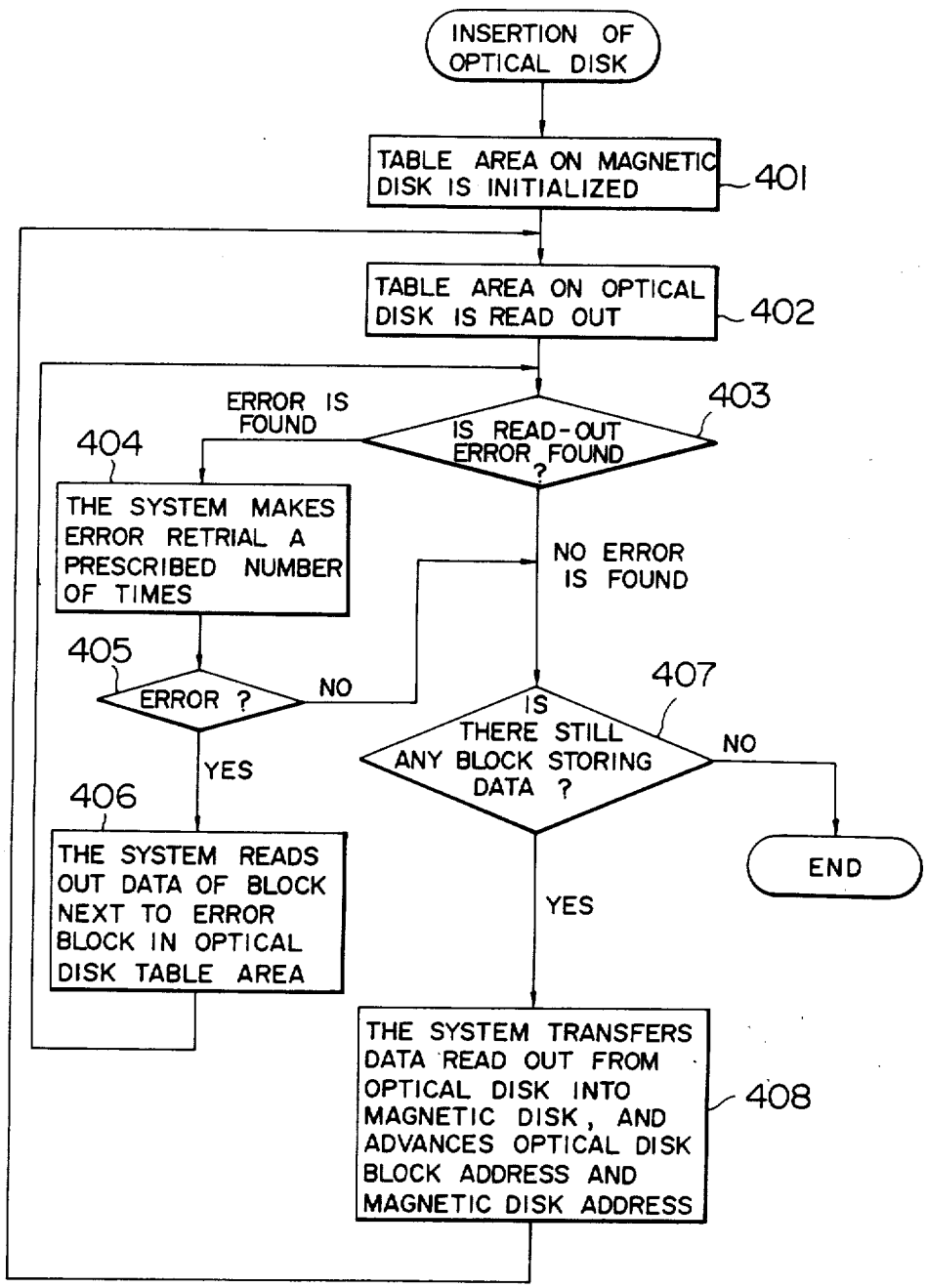
Figure 8A:
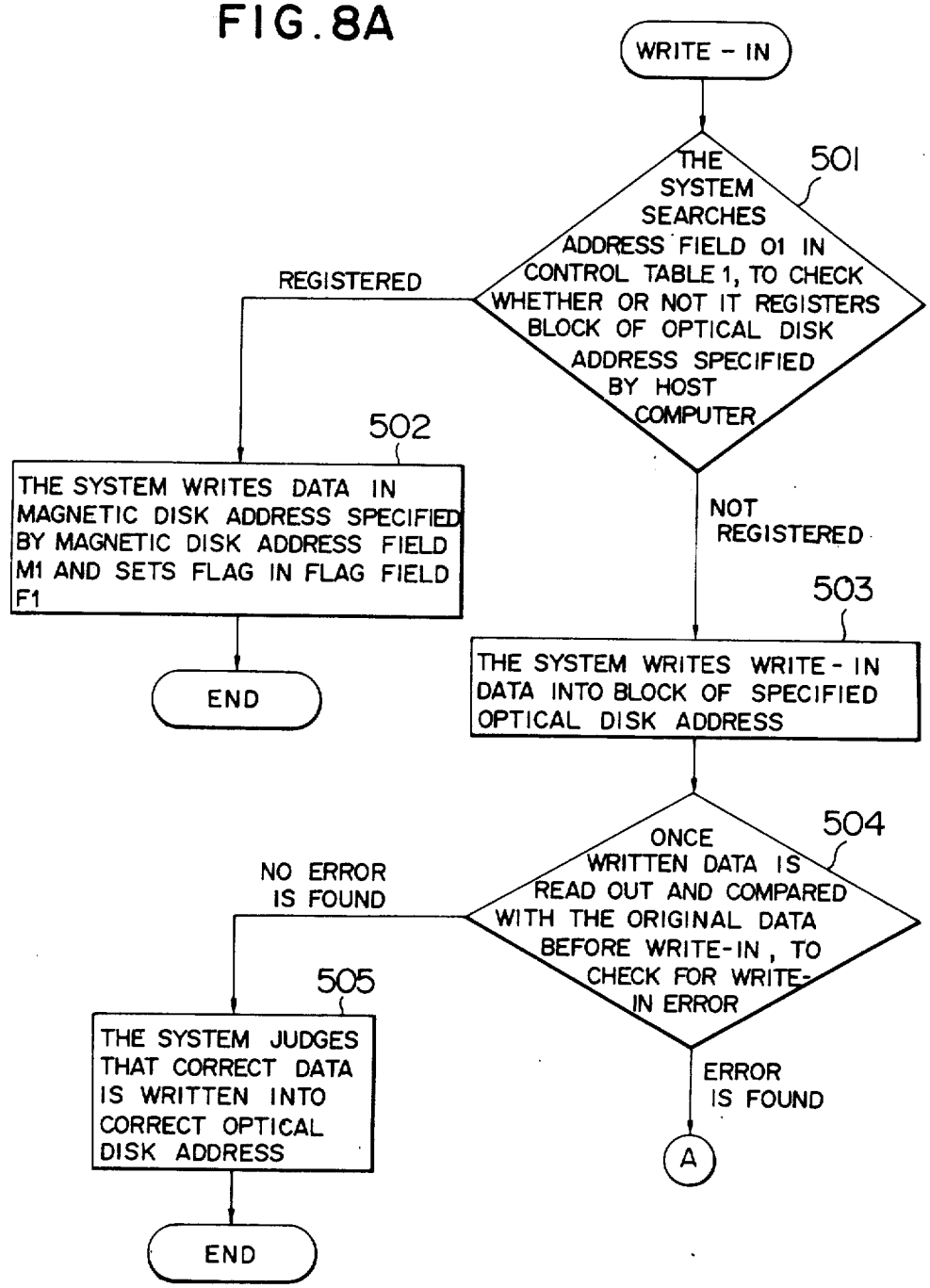
FIGS. 8A, 8B, 9A and 9B are flowcharts for various operations of a storage system according to the second embodiment of the present invention.
Figure 8B:
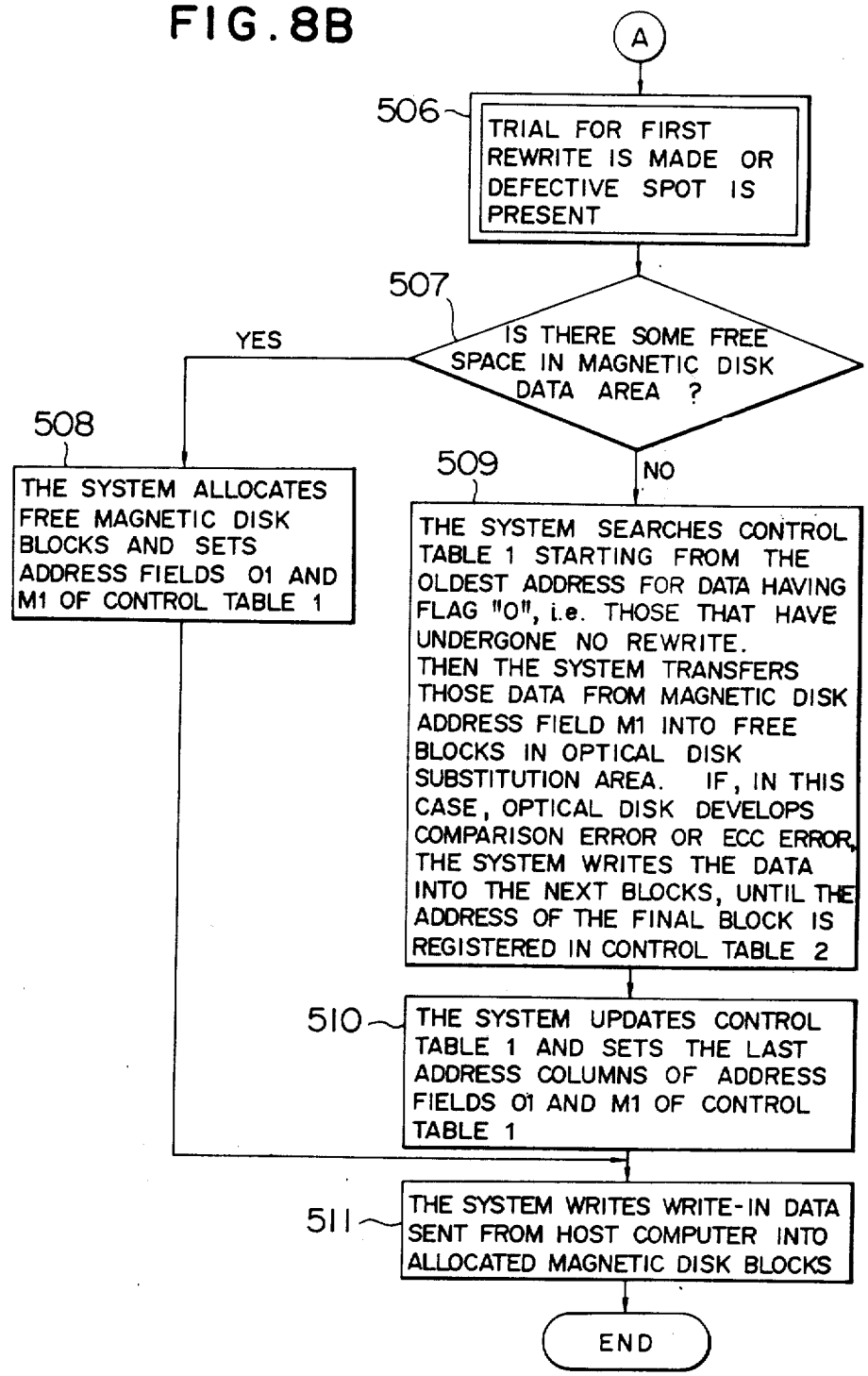

Next, the operations to be executed after this cartridge is inserted again are described below using FIG. 7. When the optical disk 12 has been inserted, first the table area 19 on the magnetic disk 14 is initialized (step 401), i.e. zero (0) is written in allover the table area 19. Then the data of the table area 17 on the optical disk 12 are read out (step 402) and checked for read-out errors (step 403) by repeating retrial a prescribed number of times (step 404). If a read-out error recurs nevertheless (step 405), a block next to the error block is read out (step 406). Then the system repeats the steps 403 through 406 until no read-out error is detected, and advances to step 407. At the step 407, the system judges whether each block stores data or not. If no data is detected in the block, the system judges that the contents of the table area 17 have all been read out, terminating the insertion of the optical disk 12. If some data are detected in the block instead, the system transfers the data into the data area 18 on the magnetic disk 14 earlier initialized and then advances both the block address on the optical disk 12 and the address on the magnetic disk 14 (step 408), returning back to the step 402. This operation is repeated until the contents of the table area 17 have all been read out.

As abovementioned, this embodiment processes write-in errors regardless of whether they are caused by trial for rewrite or by defective spots on the optical disk 12. In this embodiment the system temporarily stores the write-in error data onto the magnetic disk 14, which is capable of rewriting, thus operating as is capable of rewriting.

Next, the second embodiment of the present invention is described on its read/write operations using FIGS. 8A, 8B, 9A and 9B. The first embodiment, as mentioned above, first performs read/write operations on the optical disk 12 and then, if an error is detected, checks both the control tables 1 and 2 for the subsequent processes. In this first embodiment, the access time of the optical disk 12, which has a large storage capacity, is rather long, resulting in much time required for read/write operations. This second embodiment, unlike the first one, checks first the control tables 1 and 2, being featured in a shorter time required for read/write operations.

The write-in operation by this second embodiment is as follows: The system, before writing data on the optical disk 12, first searches the address field O1 in the control table 1 to check whether the block of an optical disk address specified by the host computer 1 is registered or not (step 501). If this block is found to be registered, the system writes a write-in data into the magnetic disk address specified by the magnetic disk address field M1 and then sets the corresponding flag in the flag field to 1 (step 502), terminating the operation. If that block is found not to be registered instead, the system writes a write-in data into the block of a specified optical disk address (step 503). Then the system reads out a thus written data to compare it with the original data before the write-in (step 504). If no error is detected as a result of this read-out, the system judges that a correct data has been written into a correct optical address (step 505), terminating the operation. If an error is detected instead, the system executes steps 506 through 511 to conduct prescribed processes. These processes of the steps 506 through 511, which are totally the same as the steps 106 through 111 shown in FIG. 4B, are not described here.

Figure 9A:
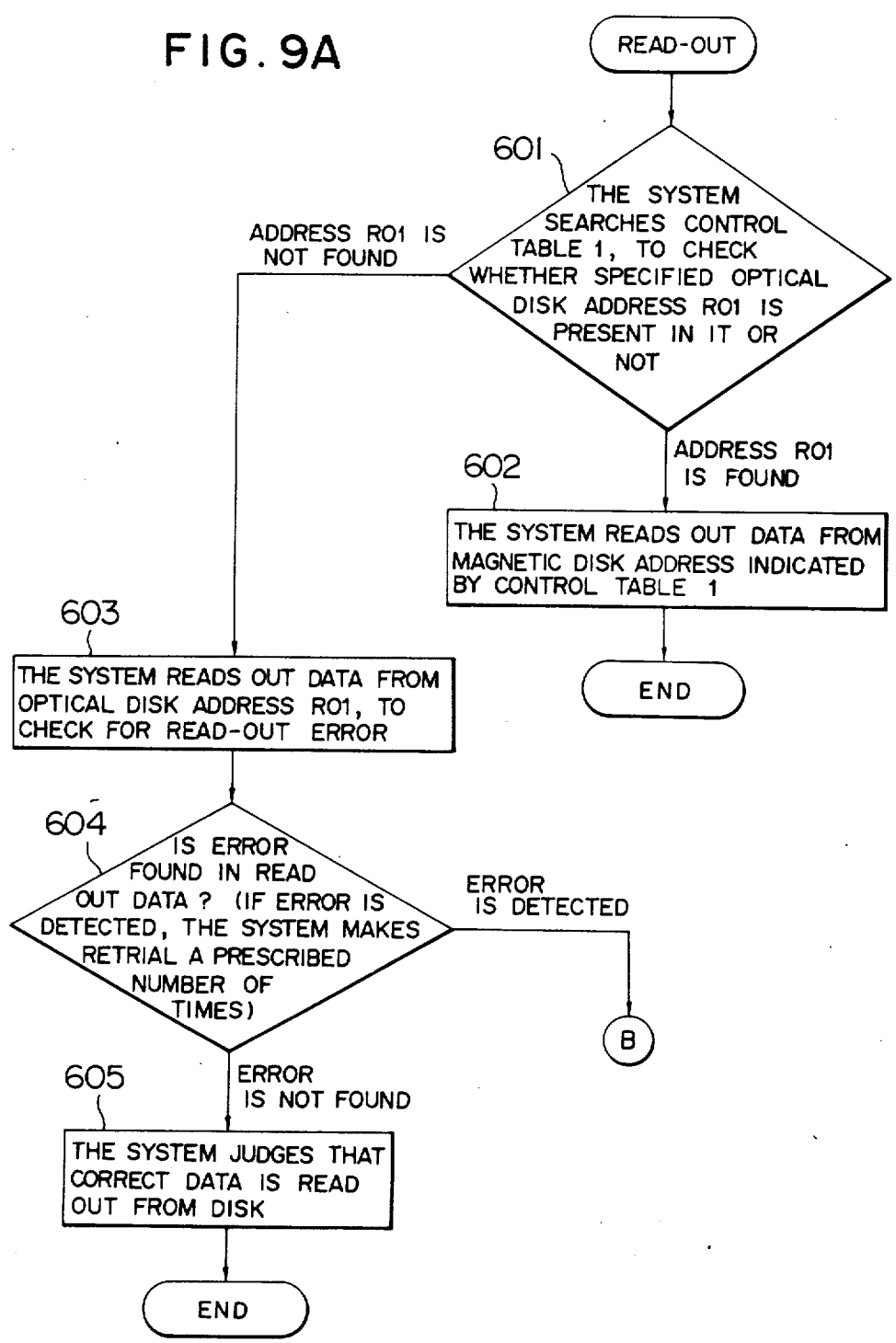
Figure 9B:
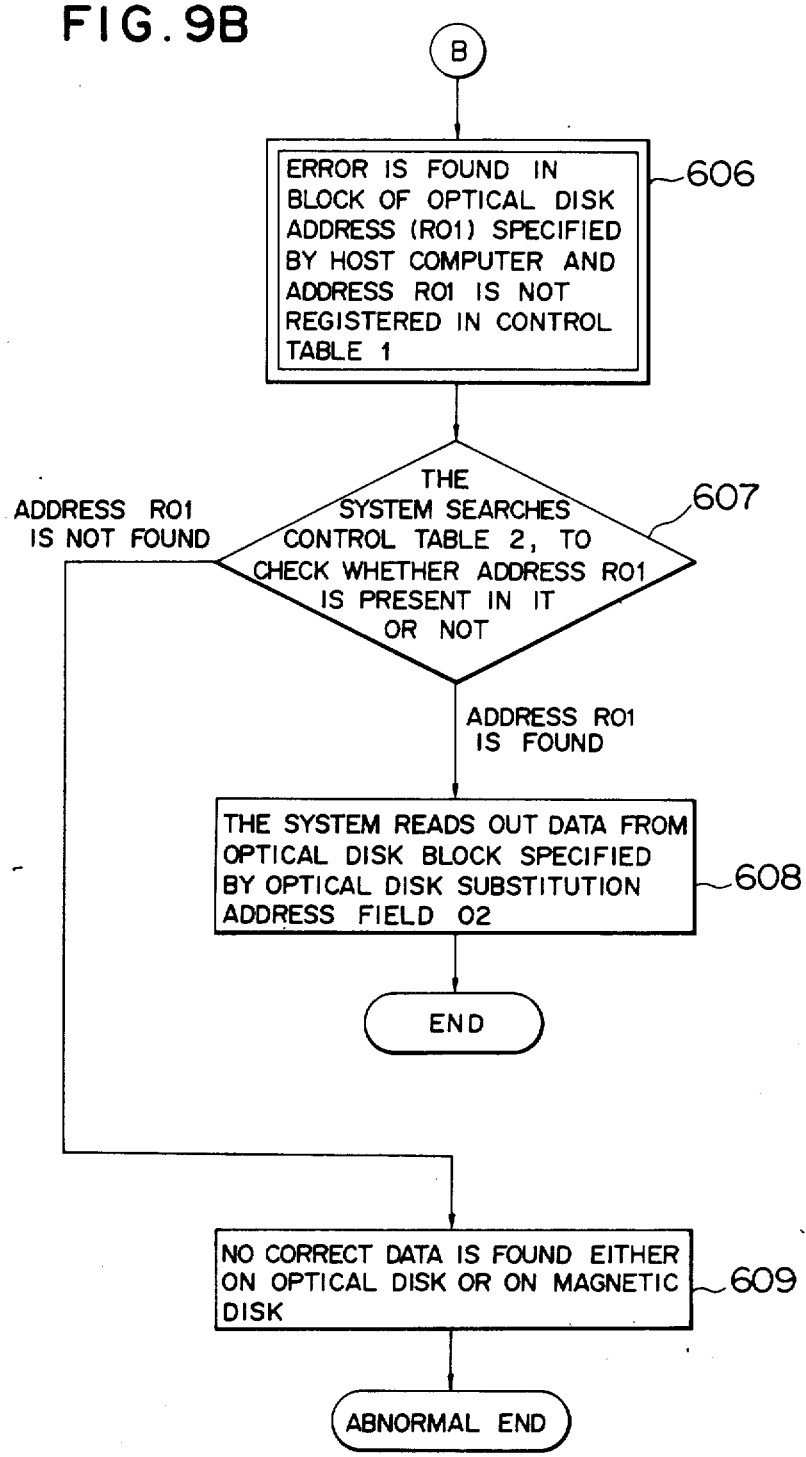

Next, the read-out operation by this second embodiment is as follows: As shown in FIGS. 9A and 9B, the system first searches the address field O1 in the control table 1, to check whether the specified optical disk address RO1 is present in it or not (step 601). When the address RO1 is found, the system reads out the data from a magnetic disk address specified in the control table 1 (step 602), terminating the operation. If the address RO1 is not found instead, the system reads out the data from the optical disk address RO1 (step 603), to check whether thus read out data is erroneous or not (step 604). If the data does not have any error, the system judges the data to have been read out correctly from the optical disk (step 605), terminating the operation. If an error recurs even after retrial for the read-out and check has been repeated a prescribed number of times, the system executes steps 606 through 609 to perform the necessary prescribed processing. The steps 606 through 609, which are totally the same as the steps 206 through 209 in FIG. 5B, are not described here.

As abovementioned, this second embodiment of the present invention executes read/write operations of the optical disk only where necessary, thereby successfully reducing the access time.

In addition, semiconductor memories, for example, may be used instead of magnetic memories as a storage capable of rewriting, unlike the abovementioned two embodiments. The main storage of the host computer may also be used as a storage capable of rewriting. Moreover, the host computer may serve as the controller, instead of a control unit independently provided.

As abovementioned, the present invention enables the system which uses an optical disk or other large-capacity storages incapable of rewriting to operate as is capable of rewriting.

What is claimed is:

1. A storage system which comprises:
   a bus line;
   a first storage unit incapable of rewriting connected to said bus line;
   a second storage unit capable of rewriting connected to said bus line, said second storage unit having a control table for registering one or more addresses of said first storage unit in which data are desired to be rewritten and one or more addresses of said second storage unit in which said rewrite data are temporarily stored; and
   a control unit connected to said bus line for controlling said second storage unit in accordance with said control table such that said data desired to be rewritten into said addresses of said first storage unit are temporarily stored in the corresponding addresses of said second storage unit.

2. A storage system according to claim 1, wherein said control unit performs a read/write operation on one of said addresses of said first storage unit when it receives a read/write instruction to read data from or write data into said first storage unit, and searches, if a read/write error is detected, said control table for that one of the addresses of said second storage unit which corresponds to that one of the addresses of said first storage unit which is identical to an address of said read/write instruction.

3. A storage system according to claim 2, wherein:
   said first storage unit has a data area and a substitution area;
   said control table further registers identification information in relation to each of said addresses of said first storage unit, said identification information indicating the number of trials for rewriting into said each of said addresses, and one or more addresses in said substitution area in which said rewrite data are stored; and
   said control unit, when there is no address identical to an address of a write instruction in said control table, registers in said control table said address of said write instruction as one of said addresses of said first storage unit, and also an address of a free space in the second storage unit as one of said addresses of said second storage unit, transfers, when no free space is found in said second storage unit, said rewrite data having the lowest number of trials for rewriting indicated by said identification information from said second storage unit to said substitution area, thus creating a free space in said second storage unit, and also registers the address of said substitution area to which said rewrite data is transferred, in said control table.

4. A storage system according to claim 2, wherein:
   said first storage unit has a data area and a substitution area;
   said control table further registers one or more addresses in said substitution area in which said rewrite data are stored; and
   said control unit reads out said rewrite data from said second storage unit or said substitution area in accordance with the address of said second storage unit or the address in said substitution area which corresponds to the address of said first storage unit which is identical to an address of said read instruction.

5. A storage system according to claim 1, wherein: said control unit, when it receives a read/write instruction for said first storage unit, searches said control table for the address of said first storage unit which is identical to an address of said read/write instruction, if it is found, reads out data from or writes it into the address of said second storage unit which corresponds to the address of said first storage unit which has been found, and, if it is not found, reads out data or writes it inot the address of said first storage unit.

6. A storage system according to claim 5, wherein: said first storage unit has a data area and a substitution area;

said control table further registers identification information in relation to each of said addresses of said first storage unit, said identification information indicating the number of trials for rewriting into said each of said addresses, and one or more addresses in said substitution area in which said rewrite data are stored; and said control unit, when there is no address identical to an address of a write instruction in said control table, registers in said control table said address of said write instruction as one of said addresses of said first storage unit, and also an address of a free space in the second storage unit as one of said addresses of said second storage unit, transfers, when no free space is found in said second storage unit, said rewrite data having the lowest number of trials for rewriting indicated by said identification information from said second storage unit to said substitution area, thus creating a free space in said second storage unit, and also registers the address of said substitution area to which said rewrite data is transferred, in said control table.

7. A storage system according to claim 5 wherein: said first storage unit has a data area and a substitution area;

said control table further registers one or more addresses in said substitution area in which said rewrite data are stored; and said control unit reads out said rewrite data from said second storage unit or said substitution area in accordance with the address of said second storage unit or the address in said substitution area which corresponds to the address of said first storage unit which is identical to an address of said read instruction.

8. A storage system according to claim 1 wherein: said first storage unit has a removable storage medium which has a data area and a substitution area;

said control table further registers one or more addresses in said substitution area; and said control unit, before removing said storage medium from said first storage unit, transfers said rewrite data from said second storage unit into said substitution area, registers, at the same time, the destination addresses of said substitution area to which said rewrite data are transferred in said control table as the addresses of said substitution area, and also stores in said storage medium a table which registers both the addresses of said substitution area and the addresses of said first storage unit which have been registered in said control table.

9. A storage system according to claim 8 wherein: said control unit, upon insertion of said storage medium into said first storage unit, registers in said control table said table stored in said storage medium, transfers, in accordance with the addresses of said substitution area stored in said table, rewrite data from said data area in said storage medium into said second storage unit, and also registers the destination addresses of said second storage unit to which the data are transferred, in said control table.

10. A storage system which comprises:
a bus line;
a first storage unit incapable of rewriting connected to said bus line;
a second storage line unit capable of rewriting connected to said bus line;
a third storage unit capable of rewriting connected to said bus line, said third storage unit having a control table for registering one or more addresses of said first storage unit in which data are desired to be rewritten and one or more addresses of said second storage unit in which said rewrite data are temporarily stored; and
a control unit connected to said bus line for controlling said second storage unit in accordance with said control table such that said data desired to be rewritten into said addresses of said first storage unit are temporarily stored in the corresponding addresses of said second storage unit.

11. A storage system according to claim 10, wherein said control unit performs a read/write operation on one of said addresses of said first storage unit when it receives a read/write instruction to read data from or write data into said first storage unit, and searches, if a read/write error is detected, said control table for that one of the addresses of said second storage unit which corresponds to that one of the addresses of said first storage unit which is identical to an address of said read/write instruction.

12. A storage system according to claim 11, wherein: said first storage unit has a data area and a substitution area;

said control table further registers identification information in relation to each of said addresses of said first storage unit, said identification information indicating the number of trials for rewriting into said each of said addresses, and one or more addresses in said substitution area in which said rewrite data are stored; and said control unit, when there is no address identical to an address of a write instruction in said control table, registers in said control table said address of said write instruction as one of said addresses to said first storage unit, and also an address of a free space in the second storage unit as one of said addresses of said second storage unit, transfers, when no free space is found in said second storage unit, said rewrite data having the lowest number of trials for rewriting indicated by said identification information from said second storage unit to said substitution area, thus creating a free space in said second storage unit, and also registers the address of said substitution area to which said rewrite data is transferred in said control table.

13. A storage system according to claim 11, wherein:

said first storage unit has a data area and a substitution area;

said control table further registers one or more addresses in said substitution area in which said rewrite data are stored; and said control unit reads out said rewrite data from said second storage unit or said substitution area in accordance with the address of said second storage unit or the address in said substitution area which corresponds to the address of said first storage unit which is identical to an address of said read instruction.

14. A storage system according to claim 10, wherein said control unit, when it receives a read/write isntruction for said first storage unit, searches said control table for the address of said first storage unit which is identical to an address of said read/write instruction and if it is found, reads out data from or writes data into the address of said second storage unit which corresponds to the address of said first storage unit which has been found, and, if it is not found, reads out data or writes it into the address of said first storage unit.

15. A storage system according to claim 14, wherein: said first storage unit has a data area and a substitution area;

said control table further registers indentification information in relation to each of said addresses of said first storage unit, said identification information indicating the number of trials for rewriting into said each of said addresses, and one or more addresses in said substitution area in which said rewrite data are stored; and said control unit, when there is no address identical to an address of a write instruction in said control table, registers in said control table said address of said write instruction as one of said addresses of said first storage unit, and also an address of a free space in the second storage unit as one of said addresses of said second storage unit; transfers, when no free space is found in said second storage unit, said rewrite data having the lowest number of trials for rewriting indicated by said identification information from said second storage unit to said substitution area, thus creating a free space in said second storage unit; and also registers the address of said substitution area to which said rewrite data is transferred in said control table.

16. A storage system according to claim 14, wherein: said first storage unit has a data area and a substitution area;

said control table further registers one or more addresses in said substitution area in which said rewrite data are stored; and said control unit reads out said rewrite data from said second storage unit or said substitution area in accordance with the address of said second storage unit or the address in said substitution area which corresponds to the address of said first storage unit which is identical to an address of said read instruction.

17. A storage system according to claim 10, wherein: said first storage unit has a removable storage medium which has a data area and a substitution area;

said control table further registers one or more addresses in said substitution area; and said control unit, before removing said storage medium from said first storage unit, transfers said rewrite data from said second storage unit into said substitution area; registers at the same time the destination addresses of said substitution area to which said rewrite data are transferred in said control table as the addresses of said substitution area; and also stores in said storage medium a table which registers both the addresses of said substitution area and the addresses of said first storage unit which have been registered in said control table.

18. A storage system according to claim 17, wherein said control unit, upon insertion of said storage medium into said first storage unit, registers in said control table said table stored in said storage medium; transfers, in accordance with the addresses of said substitution area stored in said table, rewrite data from said data area in said storage medium into said second storage unit; and also registers the destination addresses of said second storage unit to which the data are transferred, in said control table.

* * * * *